Aug. 28, 1956 F. W. BOWEN 2,760,914
ADDITION OF GRANULAR SOLIDS TO A HYDROCARBON
CONVERSION SYSTEM
Filed March 6, 1952
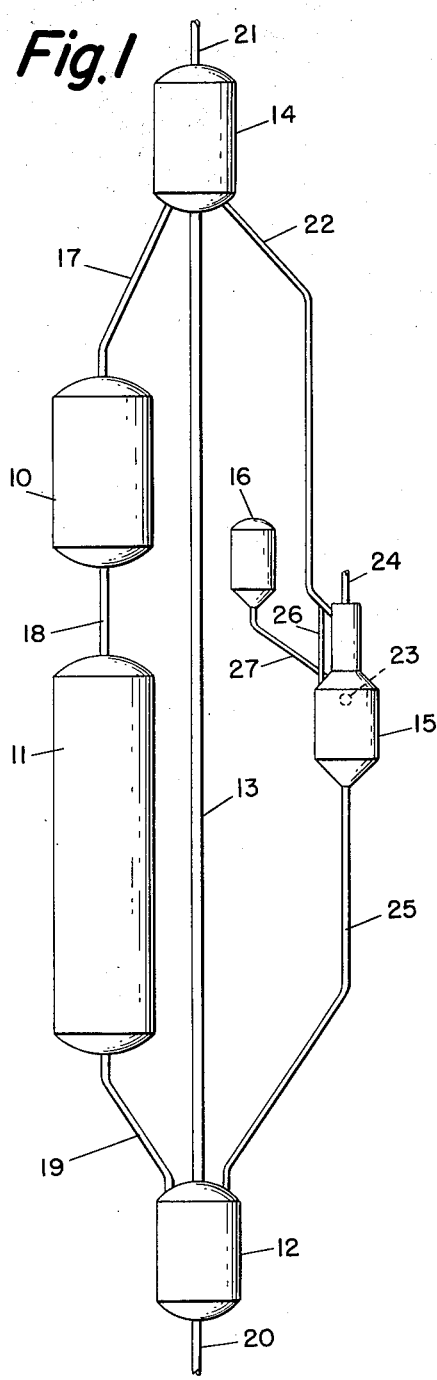
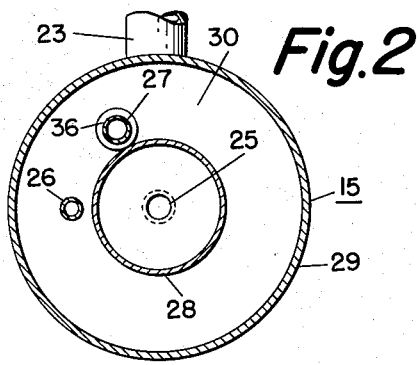
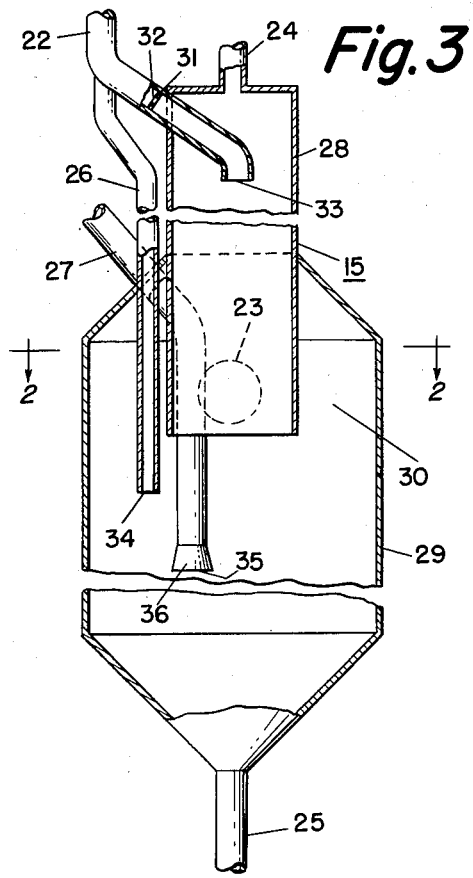
INVENTOR.
FRANK W. BOWEN
BY
Busser Smith and Harding
ATTORNEYS

United States Patent Office 2,760,914
Patented Aug. 28, 1956

2,760,914

ADDITION OF GRANULAR SOLIDS TO A HYDROCARBON CONVERSION SYSTEM

Frank W. Bowen, Toledo, Ohio, assignor to Sun Oil Company, Philadelphia, Pa., a corporation of New Jersey Application March 6, 1952, Serial No. 275,173

9 Claims. (Cl. 196—52)

This invention relates to process and apparatus for the conversion of hydrocarbon material by contact with a moving compact bed of granular solids and more particularly to process and apparatus for addition of granular solids to a hydrocarbon conversion system.

It is known in the art to effect hydrocarbon conversion by contacting hydrocarbon material with a moving compact bed of granular contact material capable of promoting the hydrocarbon conversion reaction. Contact material which can be used for such purpose includes granular catalysts, activated clay catalysts and other well known hydrocarbon conversion catalysts, and also includes inert heat transfer material for use in thermal conversion processes. The types of hydrocarbon reaction which can be effected are various, including, for example, cracking, hydrogenation, dehydrogenation, aromatization, desulfurization, and other well known reactions of mineral oil or other hydrocarbon materials.

Customary practice in hydrocarbon conversion processes of the "moving bed" type involves gravitation of a compact bed of granular solids through a conversion vessel wherein hydrocarbon material is contacted with the granular solids in order to effect the conversion reaction; the granular solids are then generally gravitated through a regeneration vessel wherein carbonaceous materials deposited on the granular solids during the conversion reaction are burned from the surface of the solid particles by contact with free-oxygen-containing gas. It is further customary to elevate the granular solids from a low point in the hydrocarbon conversion system to a high point therein in order that the solids can again be gravitated through the conversion vessel and the regeneration vessel, and it is known in the art to use for such elevation either mechanical elevating means such as a bucket elevator, or pneumatic elevating means. The relative positioning of the reaction vessel and the regeneration vessel varies in hydrocarbon conversion systems and the two vessels can be positioned one above the other or side by side. In the latter case it is generally necessary to provide elevating means to elevate granular solids from the bottom of the conversion vessel to the top of the regeneration vessel and separate elevating means to elevate granular solids from the bottom of the regeneration vessel to the top of the conversion vessel.

The apparatus thus far described, including contacting vessels such as conversion and regeneration vessels and elevating means, constitutes a main circulation system for circulation of granular solids in a cyclic fashion. During circulation of solids through such a main circulation system attrition generally occurs with resulting formation of relatively fine granular solids. In order to prevent excessive accumulation of such relatively fine solids within the main circulation system it is customary to withdraw a portion of the granular solids from the main circulation system and pass that portion through an auxiliary circulation system including elutriating means for removing relatively fine solids from the side stream, and then return the side stream to the main circulation system. In order to replace the fine granular solids which are removed by such elutriating means, it is necessary to add fresh granular solids to the process system. Such addition of fresh solids also serves to maintain the average conversion activity of the granular solids in the system at the desired level; the conversion activity, or effectiveness of the solids in promoting the hydrocarbon conversion reaction, generally decreases with increasing use of the granular solids in the conversion system and it is necessary to add fresh solids to compensate for such activity decrease.

Previously fresh granular solids have been added to hydrocarbon conversion process systems as various points in the system, generally to some portion of the main circulation system; but certain disadvantages have been encountered in all such previous methods of introducing fresh granular solids into the process system. The disadvantages encountered generally result from undesirable thermal effects which occur to the fresh solids when they are introduced into the process system and which tend to weaken the solids and make them more subject to attrition. Attrition is an effect which should be minimized in hydrocarbon conversion processes since it results in undesirably high rates of loss of solids from the system, requiring higher rates of addition of fresh solids to the system, and also causes undesirable effects in the contacting zones where compact beds of granular solids are contacted with hydrocarbon material and free-oxygen-containing gas.

The undesirable thermal effects which occur in prior art methods of adding fresh granular solids to the hydrocarbon conversion process system arise from the fact that the fresh granular solids must be heated to elevated temperatures, for example, 800–1200° F. in order to be used in the process system. The most economical way of effecting this heating is by direct contact of the fresh granular solids with the hot granular solids already circulating in the process system. However, when fresh granular solids are introduced into the main circulation system according to prior art methods the heating of the fresh granular solids is effected in such a sudden manner that the fresh granular solids are weakened by the thermal shock which they undergo and are therefore subject to high attrition. It is believed that the thermal weakening of fresh granular solids when introduced according to prior art methods into the main circulation system is probably caused by rapid vaporization of water from the capillaries of the solid particles with resulting strains upon the particle structure and increased susceptibility to fracture of the particle when subjected to any outside stress.

According to the present invention the prior art disadvantages as previously described are minimized or eliminated by introducing fresh granular solids into the auxiliary circulation stream, rather than into the main circulation system, and more specifically into the elutriating vessel in the auxiliary system in a manner as subsequently more fully described. Thermal weakening of the granular solids is very much reduced according to the present invention and it is believed that this reduction in thermal weakening is obtained since it is possible to introduce fresh granular solids continuously into the auxiliary system with a relatively high ratio of fresh solids to hot granular solids in the zone where first contact of fresh solids with hot granular solids occurs. Since the circulation rate of hot granular solids through the auxiliary circulation system is much lower than the circulation rate of hot granular solids through the main circulation system the addition of fresh granular solids at a given rate to the auxiliary circulation system provides a higher ratio of fresh solids to hot granular solids than addition of fresh granular solids at the same rate to the main circulation system. The higher ratio of fresh solids to hot solids obtained according to the present invention results in less rapid heating of the fresh granular solids and therefore in less thermal weakening of the fresh granular solids.

According to the present invention fresh granular solids are introduced into the elutriating vessel at a level beneath the upper surface of a compact bed gravitating through a solids receiving zone in a lower portion of the vessel. Hereafter in the specification, the solids receiving zone will be referred to as a lower portion of the elutriator, the latter being used as a convenient term to describe a vessel containing an upper elutriating zone and a lower solids receiving zone. Introduction of fresh granular solids in this manner makes it possible to achieve a slow steady rate of introduction less subject to fluctuation of rate than when the fresh granular solids are introduced at some other level, for example above the upper surface of the compact bed gravitating through a lower portion of the elutriator. The introduction of fresh granular solids at a relatively slow rate is advantageous in that it allows the solids to be gradually preheated before introduction into contact with the hot granular solids already in the system. The gradual preheating causes the fresh granular solids to be less subject to weakening by the effect of the contact with the hot granular solids.

Means are provided according to the present invention to insure maintenance of the upper surface of the compact bed at a level above the level of introduction of fresh granular solids into the elutriator in order that the above-mentioned advantages may be obtained. This maintenance of bed level is achieved by dividing the side stream of granular solids removed from the main circulation system into two sub-portions of granular solids. One sub-portion is introduced into an upper portion of the elutriator and falls downwardly therethrough onto the upper surface of the compact bed. The other sub-portion is gravitated as a compact mass through a bypass line which introduces the latter sub-portion of solids into a lower portion of the elutriator and directly into the compact bed gravitating through the lower portion of the elutriator. The fresh granular solids are introduced into the lower portion of the elutriator at a level beneath the point of introduction of granular solids from the bypass line into the compact bed. As subsequently more fully described in connection with the drawing, this operation provides maintenance of the upper surface of the compact bed above the point of introduction of fresh granular solids into the elutriator.

The invention will be further described with reference to the attached drawing. Figure 1 illustrates a solids circulation system such as may be employed, for example, in a process for hydrocarbon conversion by contacting hydrocarbons with a compact moving bed of granular solids. Figures 2 and 3 are sectional plan and elevation views respectively of the elutriating vessel illustrated schematically in Figure 1.

In Figure 1 there are shown contacting vessels 10 and 11, gas lift engaging vessel 12, lift conduit 13, gas lift disengaging vessel 14, elutriator 15, and fresh solids supply hopper 16.

In operation granular solids are gravitated from the bottom of disengager 14 through line 17 into vessel 10 which may be for example a hydrocarbon conversion vessel. From vessel 10 solids are gravitated through line 18 into vessel 11 which may be for example a solids regeneration vessel. From vessel 11 solids are gravitated through line 19 into gas lift engaging vessel 12. Lifting gas is introduced into engager 12 through line 20 and passes upwardly through lift conduit 13 carrying with it granular solids in suspension. The granular solids and lifting gas are discharged from lift conduit 13 into disengager 14 wherein granular solids settle out of the lifting gas and are collected as a compact bed in the bottom of disengager 14. Lifting gas after separation from the main bulk of the granular solids is withdrawn from disengager 14 through line 21. From the bottom of disengager 14 solids are again gravitated through line 17 to complete the catalyst circulation cycle.

During circulation of granular solids through the cycle as above described the solids undergo attrition with resulting formation of relatively fine granular solids. To prevent excessive building up of fine solids within the system a portion of the granular solids in the bottom of disengager 14 is gravitated through line 22 into elutriator 15 and falls therethrough onto the surface of a compact bed in a lower portion of elutriator 15. Elutriating gas is introduced into elutriator 15 through line 23 and passes upwardly in elutriator 15 countercurrent to the falling solids. The elutriating gas selectively entrains the relatively fine solids in the falling solids stream and carries the relatively fine solids upwardly out of the elutriator through line 24. Granular solids from which relatively fine solids have been removed are withdrawn from elutriator 15 through line 25 and introduced into engager 12.

In order to maintain the level of the compact bed in the bottom of elutriator 15 at a suitably high position a portion of the granular solids gravitating through line 22 is introduced through line 26 into a lower portion of elutriator 15. Also, in order to replace granular solids removed through the system through line 24, and to replace any granular solids which may be removed in any suitable manner from any other portion of the system, fresh granular solids are gravitated from supply hopper 16 through line 27 into a lower portion of elutriator 15. The manner of introduction of granular solids through lines 26 and 27 into a lower portion of elutriator 15 will be more fully described in connection with Figures 2 and 3.

In Figures 2 and 3 elutriator 15 is illustrated in greater detail and is shown to have an upper portion 28 and a lower portion 29, both cylindrical, lower portion 29 having greater cross section than upper portion 28. Upper portion 28 extends downwardly into lower portion 29 to a certain extent to provide an annular space 30. Elutriating gas conduit 23 communicates with the annular space 30 so that elutriating gas can be introduced from conduit 23 into the annular space 30 and thence into the lower end of upper portion 28 of elutriator 15. Conduit 22 has within it a transverse plate 31 through which there is an orifice 32. The plate 31 is situated beneath the junction of conduit 22 with bypass line 26. The outlet 34 of bypass line 26 is situated below the lower end of upper portion 28 of elutriator 15 and above the outlet 35 of fresh solids line 27, which has a lower frustoconical portion 36.

In operation granular solids are gravitated through line 22, and a portion of the solids thus gravitated enters line 26, and the remainder passes through orifice 32 in plate 31 and after discharge through pipe outlet 33 falls downwardly through upper portion 28 of elutriator 15 and onto the surface of the compact bed in the bottom of elutriator 15. The solids which gravitate through bypass line 26 are introduced into the same compact bed. By employing the bypass line 26 the surface level of the compact bed is prevented from falling beneath the level of the outlet 34 of bypass line 26. This level control is effected as follows: When the level of the compact bed is above the outlet 34 the flow of solids through bypass line 26 is throttled to a certain extent because of the submersion of the outlet 34 within the compact bed and the rate of solids passing through bypass line 26 is relatively low. However, if through any instability in the system the level of the compact bed tends to fall beneath the outlet 34 the rate of solids flow through bypass line 26 automatically increases since the flow is no longer throttled by submersion of outlet 34 within the compact bed, and the increased flow through bypass line 26 prevents the bed level from falling beneath the outlet 34.

Fresh solids are introduced through line 27 into the compact bed in the lower portion of the elutriator 15 at a relatively slow rate which is determined by the ratio of the cross sectional area of the outlet 35 to the cross sectional area of lower portion 29 of elutriator 15 provided the capacity of conduit 27 is not exceeded; in which case the capacity of conduit 27 becomes the controlling factor. The granular solids in supply hopper 16 are at a low temperature relative to the temperature of the granular solids introduced into elutriator 15 through conduit 22 and are gradually heated during their travel through the lower portion of conduit 27 and therefore do not undergo as rapid heating upon contact with the granular solids in the compact bed as they would undergo if they had not been preheated to a certain extent by relatively slow passage through the conduit 27.

The positioning of the outlet 35 of conduit 27 beneath the outlet 34 of conduit 26 is advantageous in the following respects:

If the outlet 35 were positioned above the outlet 34, fluctuation in the surface level of the compact bed could result in the surface level falling beneath the outlet 35 in which case the flow rate of granular solids through conduit 27 would greatly increase through the cessation of the throttling effect which is present when the outlet 35 is submerged within the compact bed. This sudden increase in flow rate would result in the rapid addition of a large amount of fresh cold catalyst into the elutriator 15 and sudden subjection of the fresh cold catalyst, without the preheating referred to in the preceding paragraph, to the high temperature conditions existing in the elutriator. The addition of relatively large amounts of cold catalyst could cause fluctuation in the rate of catalyst circulation from engager 12 and disengager 14 and as a result erratic operation of kiln and reactor. Also, for reasons previously given the rapid heating of the fresh cold catalyst which would occur under such circumstances is disadvantageous and the present invention avoids the disadvantages resulting from such sudden heating by providing an operation which is not subject to the possibility of a sudden increase in the rate of discharge of solids from conduit 27 into elutriator 15.

As shown in Figure 3, fresh solids supply conduit 27 has a lowermost portion positioned within elutriator 15, the length of the lowermost portion being sufficiently great so that fresh granular solids, prior to introduction into the compact bed gravitating through lower portion 29 of elutriator 15, gravitate through a substantial vertical distance while in indirect heat transfer relationship with the interior of elutriator 15. Such operation is preferred according to the invention, since it provides an advantageous preheating of the fresh granular solids by indirect heat transfer prior to the heating by direct heat transfer upon introduction of the fresh granular solids into the compact bed. Preferably the length of the portion of the fresh solids supply conduit within the elutriator is at least twice the major dimension of the cross section of the fresh solids supply conduit outlet. The length of that portion of the fresh solids supply conduit can be as great as desired; generally, no particular advantage is obtained by making that length greater than twenty times the major dimension of the cross section of the fresh solids supply conduit outlet.

The outlet 35 of conduit 27 is positioned far enough below outlet 34 of bypass conduit 26 so that the outlet 35 is beneath the surface of a compact bed extending upwardly to outlet 34 and fed by a compact mass of solids issuing from the outlet 34, the outlet 35 being beneath the bed surface even when there is no throttling of the flow of solids in the compact bed. In actual operation there is generally some throttling of the flow of solids through the compact bed, for example by adjustment of a valve in the line 25, but it is necessary that the outlet 35 be positioned low enough so that it is beneath the bed surface even when the latter is at the lowest level, i. e. when there is no throttling of the solids flow in the compact bed.

The temperature of granular solids in the supply hopper 16 can vary according to the present invention. The solids can be, for example, at ordinary atmosphere temperature or they can be at substantially elevated temperature; if the solids in the supply hopper 16 have lower temperature than the hot granular solids in elutriator 15, the slow rate of introduction of solids through line 27 into elutriator 15 provides an advantageous gradual preheating of the fresh granular solids. Thus, fresh granular solids can be preheated during storage in supply hopper 16 or prior thereto, to a temperature above ordinary atmosphere temperature, but still below the temperature of hot granular solids in elutriator 15 and, then further gradually preheated by relatively slow passage through line 27 into elutriator 15. The preheating of solids during storage in supply hopper 16 or prior thereto, can be accomplished in any suitable manner, for example, by contact with hot gases, but the heating should be gradual in order to avoid weakening of the fresh granular solids through too rapid heating.

The following is an example of advantageous operation according to the present invention. In a process where granular solids are circulated through the main circulation system at a rate of about 200 tone per hour, granular solids can be withdrawn from disengager 14 through line 22 at a rate of about 25 tons per hour, about 10 tons per hour subsequently passing through bypass line 26 and about 15 tons per hour through orifice 32 into upper portion 28 of elutriator 15. About two tons per day of relatively fine granular solids can be withdrawn from elutriator 15 through line 24. Fresh granular solids can be introduced through line 27 at a rate of about 0.7 ton per hour over about a three hour period in each 24-hour period in order to provide two tons per day of fresh catalyst addition. The rate of flow of granular solids in the compact bed gravitating through lower portion 29 of elutriator 15 is in this case about 25.6 tons per hour. The diameter of lower portion 29 of elutriator 15 can be about four feet and the diameters of conduit 27 and outlet 35 about six inches and eight inches respectively in order to provide the desired proportional rate of flow of solids through conduit 27 and in the compact bed. When solids are introduced through a six inch pipe at a rate of about 0.7 ton per hour the solids having, for example, a bulk density of about 46 pounds per cubic foot, the linear rate of flow of solids through the pipe is about 2.6 feet per minute. Thus, a relatively slow rate of travel through the feed pipe is provided in order that the granular solids may be gradually preheated during their passage through the feed pipe.

Since the rate of flow of solids from outlet 35 of conduit 27 is proportional to the cross section of outlet 35, the rate of flow can be varied by providing various detachable frustoconical conduit sections having different cross sectional areas at their outlets.

Fresh granular solids, as the term is used therein, are solids which have not previously been circulated through the reaction and regeneration zones of the process system to which they are added according to the present invention.

The invention claimed is:

1. In a process for circulating granular solids which process comprises gravitating granular solids through a downflow path including a conversion zone, elevating granular solids after such gravitation to the upper end of said downflow path for gravitation again therethrough to complete a process cycle, removing from the body of solids circulating through said process cycle a portion of said body of solids, introducing said portion into an elutriating zone through which granular solids are passed as a falling stream countercurrent to a rising stream of elutriating gas which selectively entrains relatively fine solids in said falling stream, the remainder of said falling stream falling onto the upper surface of a compact bed gravitating through a solids receiving zone beneath said elutriating zone, and re-introducing granular solids from said compact bed into the body of solids circulating through said process cycle, the improvement which comprises: passing a sub-portion of said portion of said body of solids through flow rate restricting means and then through said elutriating zone as said falling stream, and gravitating a second sub-portion of said body of solids as a compact mass through a bypass line directly into said compact bed; maintaining the uppermost portion of said compact bed at a level at least as high as the outlet of said bypass line, the flow rate of solids through said bypass line being adapted to increase in response to a tendency for said uppermost portion to drop beneath said outlet; and introducing fresh granular solids into said compact bed at a level beneath the level of introduction of said second sub-portion into said compact bed.

2. Process according to claim 1 wherein said fresh granular solids, prior to introduction into said compact bed, are gravitated through a substantial vertical distance in indirect heat transfer relationship with the interior of said solids receiving zone.

3. Process according to claim 1 wherein the flow rate of the first named sub-portion is greater than the flow rate of said second sub-portion.

4. A process for circulating granular solids which comprises: gravitating granular solids through a main circulation system including a hydrocarbon conversion zone, a solids regeneration zone, means for conveying granular solids from said conversion zone to said regeneration zone, and means for conveying granular solids from said regeneration zone to said conversion zone to complete a process cycle; removing from the body of solids circulating through said main circulation system a portion of said body of solids; introducing said portion into an elutriating zone through which granular solids are passed as a falling stream countercurrent to a rising stream of elutriating gas which selectively entrains relatively fine solids in said falling stream, the remainder of said falling stream falling onto the upper surface of a compact bed gravitating through a solids receiving zone beneath said elutriating zone; passing a sub-portion of said portion of said body of solids through flow rate restricting means and then through said elutriating zone as said falling stream; gravitating a second sub-portion of said body of solids as a compact mass through a bypass line directly into said compact bed; maintaining the uppermost portion of said compact bed at a level at least as high as the outlet of said bypass line, the flow rate of solids through said bypass line being adapted to increase in response to a tendency for said uppermost portion to drop beneath said outlet introducing fresh granular solids into said compact bed at a level beneath the level of introduction of said second sub-portion into said compact bed; and re-introducing granular solids withdrawn from said compact bed into said main circulation system.

5. In apparatus for circulating granular solids, which apparatus comprises a conversion vessel and a solids regeneration vessel through which such solids gravitate, elevating means for conveying solids, after gravitation through said conversion vessel, to a level above said conversion vessel for gravitation again therethrough, an elutriating vessel in an auxiliary circulation system through which a portion of the solids, circulating through the main circulation system comprising said conversion vessel and said regeneration vessel and said elevating means, is passed and then re-introduced into said main circulation system, a solids conduit adapted to convey solids by gravitation from the main circulation system into an upper elutriating section of said elutriating vessel, a supply hopper for introduction of fresh granular solids into said apparatus, and means for re-introducing granular solids from a lower solids receiving section of said elutriating vessel into said main circulation system, the improvement which comprises: flow rate restricting means in said solids conduit, a bypass solids conduit communicating with the first-named solids conduit at a location upstream from said restricting means and having its lower outlet end positioned within said solids receiving section of said elutriating vessel; and a fresh solids supply conduit adapted to receive solids from said supply hopper and having its lower outlet end positioned within said lower solids receiving section of said elutriating vessel at a level beneath the level of said outlet end of said bypass solids conduit, said supply conduit being adapted to be positioned beneath the surface of a compact solids bed issuing from said outlet end of said bypass solids conduit.

6. Apparatus according to claim 5 wherein said fresh solids supply conduit has a lowermost portion of substantial length positioned within said elutriating vessel.

7. Apparatus according to claim 5 wherein said fresh solids supply conduit has a lowermost frustoconical portion.

8. Apparatus according to claim 5 wherein the cross-sectional area of said first-named solids conduit is greater than the cross-sectional area of said bypass solids conduit.

9. Apparatus for circulating granular solids which comprises a main circulation system including a conversion vessel, a regeneration vessel, means for conveying solids from said conversion vessel to said regeneration vessel, and means for conveying granular solids from said regenerating vessel to said conversion vessel to complete a process cycle; an elutriating vessel through which a portion of the solids, circulating through said main conversion system, is passed and then re-introduced into said system; a solids conduit adapted to convey solids by gravitation from the system into an upper elutriating section of said elutriating vessel; flow rate restricting means in said solids conduit; a supply hopper for introduction of fresh granular solids into said apparatus; a bypass solids conduit communicating with the first-named solids conduit at a location upstream from said restricting means and having its lower outlet end positioned within a lower solids receiving section of said elutriating vessel; a fresh solids supply conduit adapted to receive solids from said supply hopper and having its lower outlet end positioned within said lower solids receiving section of said elutriating vessel at a level beneath the level of said outlet end of said bypass solids conduit, said supply conduit being adapted to be positioned beneath the surface of a compact solids bed issuing from said outlet end of said bypass solids conduit; and means for re-introducing solids from said lower portion of said elutriating vessel into said main circulation system.

References Cited in the file of this patent

UNITED STATES PATENTS

| | | |
|---|---|---|
| 2,421,840 | Lechthaler et al. | June 10, 1947 |
| 2,531,192 | Bergstrom | Nov. 21, 1950 |
| 2,567,207 | Hoge | Sept. 11, 1951 |
| 2,704,740 | Oblad et al. | Mar. 22, 1955 |

OTHER REFERENCES

Petroleum Refiner Houdriflow Catalytic Cracking, September 1951, Process Section (reprint).